Oct. 24, 1939.　　　J. W. JACKSON　　　2,176,904
AIRCRAFT
Filed Nov. 18, 1936　　　4 Sheets-Sheet 4
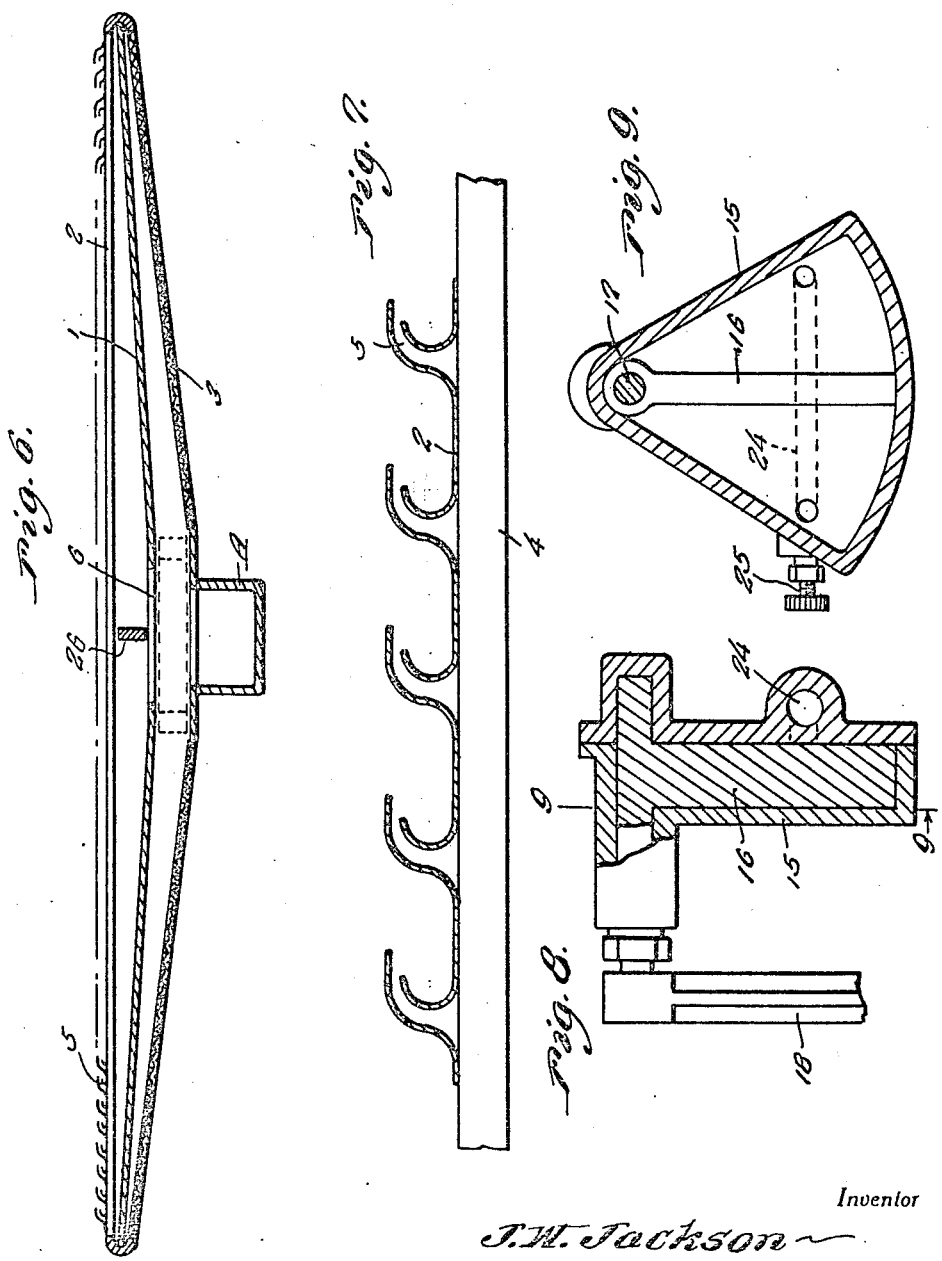

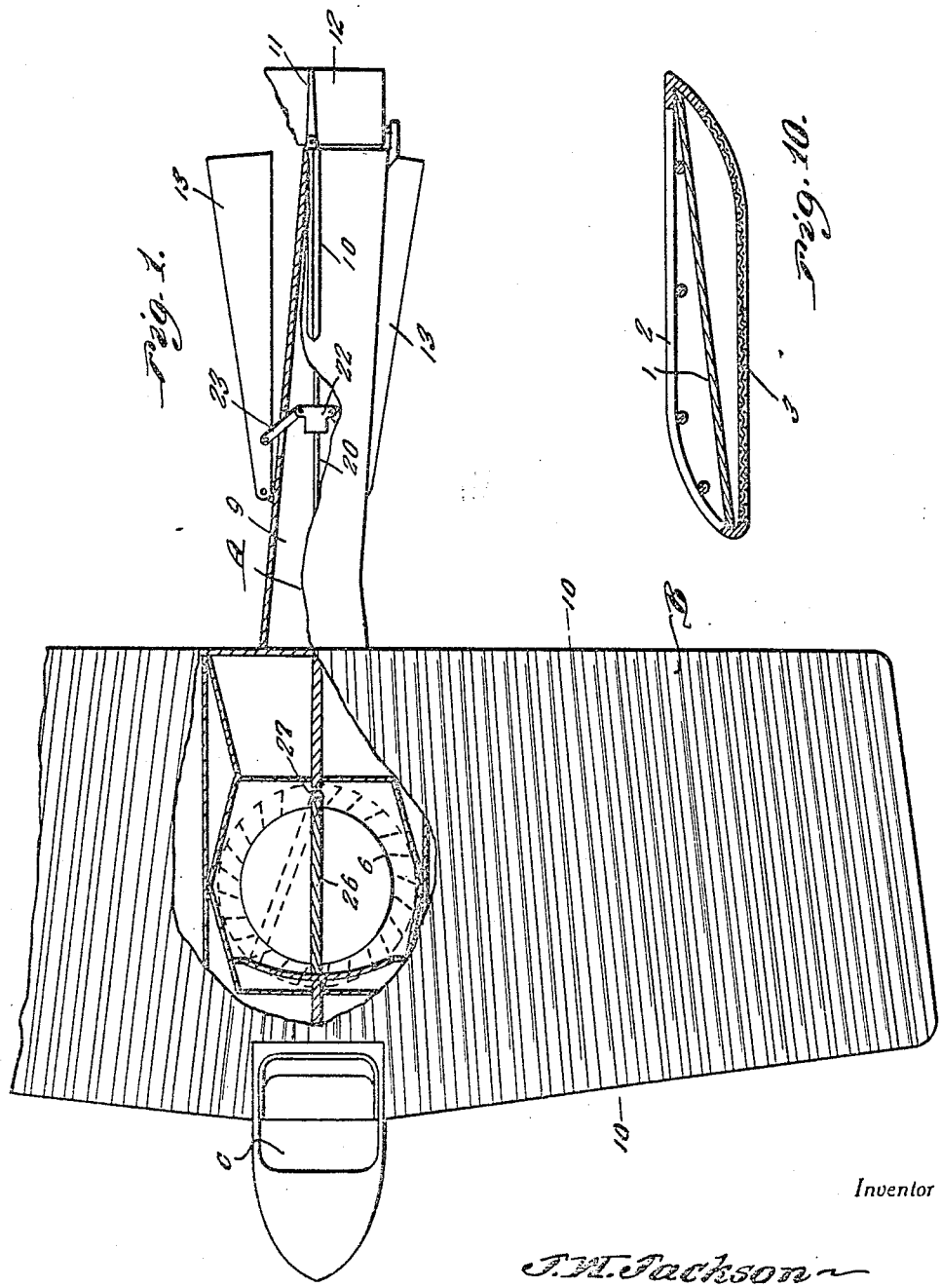

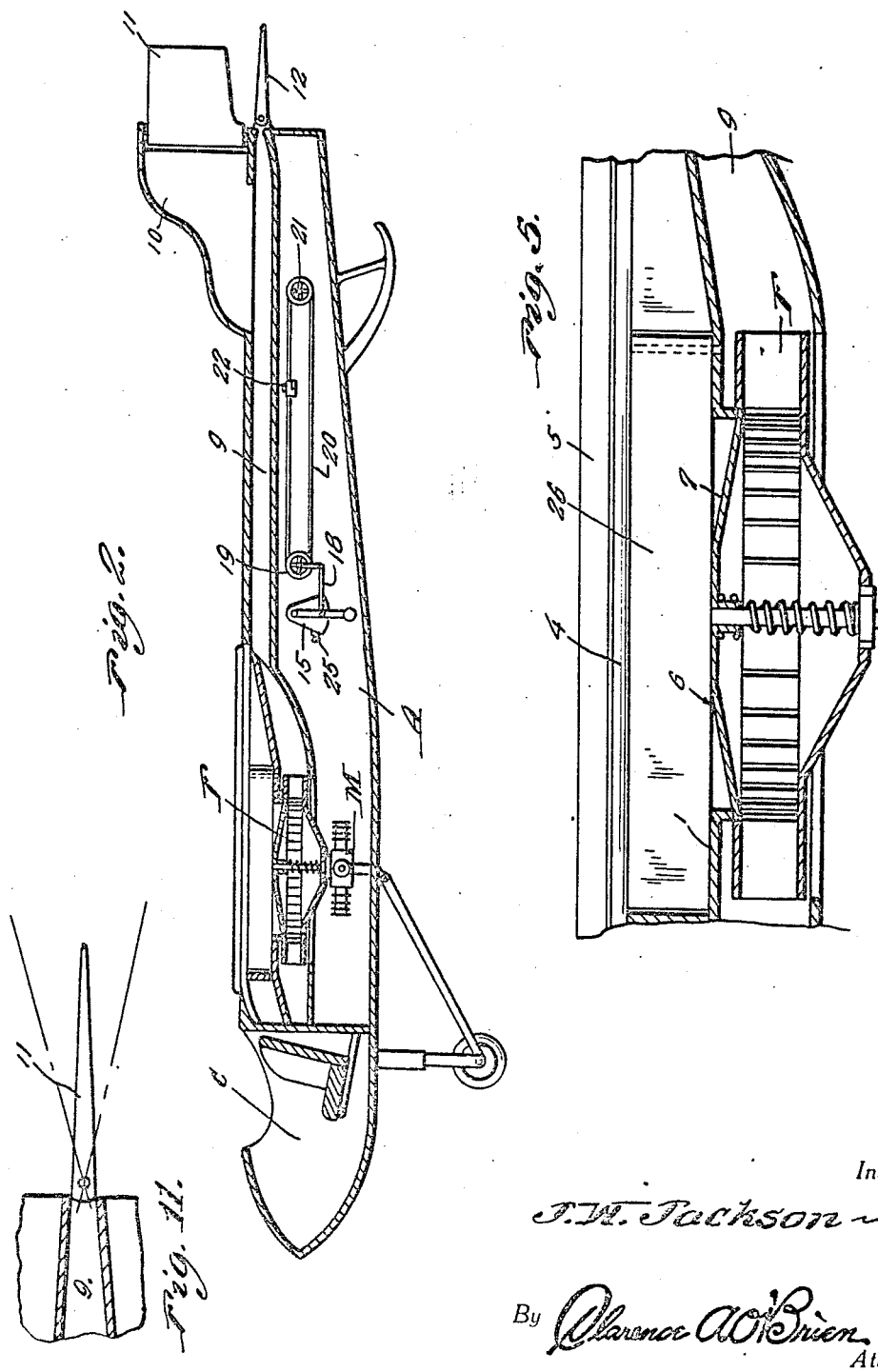

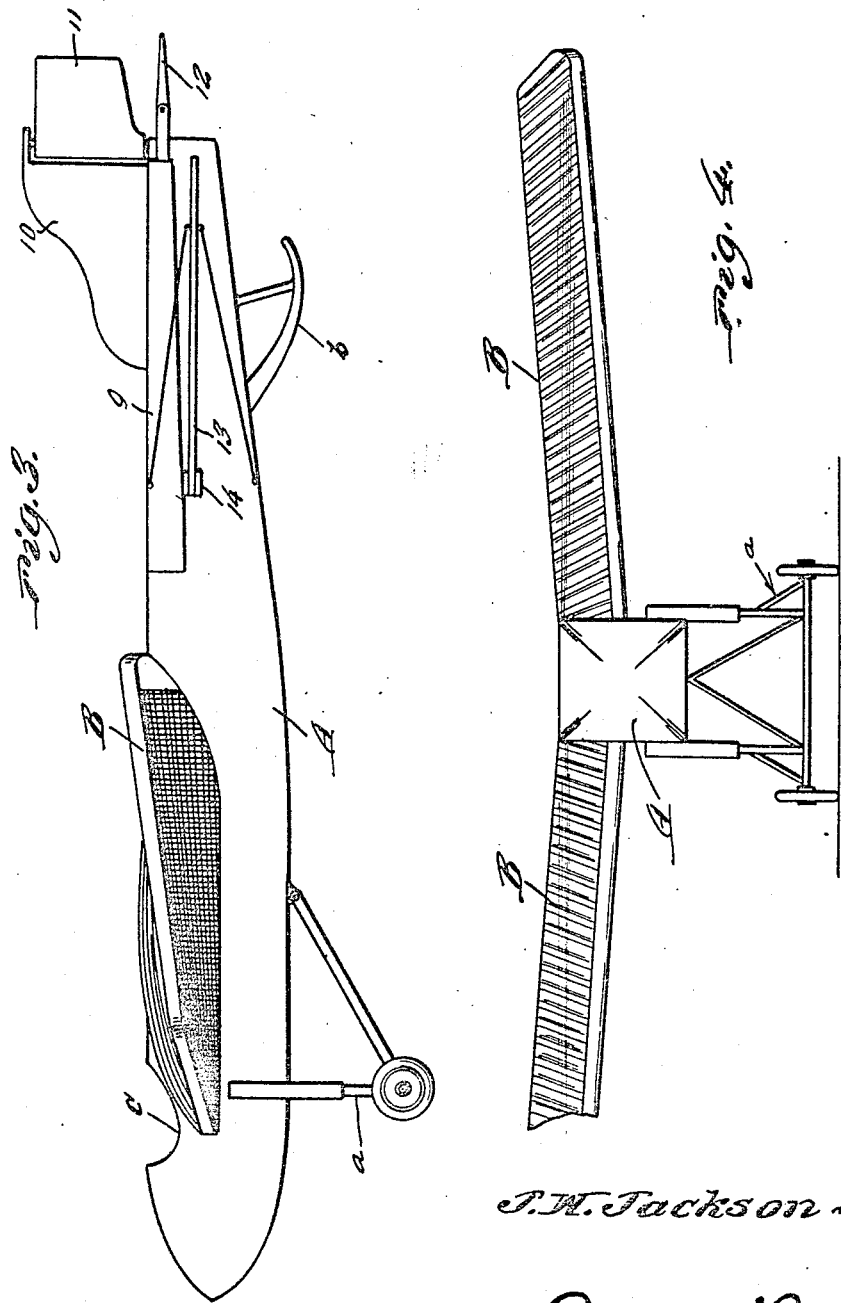

Patented Oct. 24, 1939

2,176,904

UNITED STATES PATENT OFFICE 2,176,904

AIRCRAFT

John W. Jackson, Glen Allen, Va., assignor of one-half to Emory D. Erwin, Richmond, Va.

Application November 18, 1936, Serial No. 111,509

2 Claims. (Cl. 244—40)

This invention relates to improvements in aircraft, the general object of the invention being to provide means for creating lifting power, and control regardless of forward motion; to practically eliminate resistance to the forward movement of the craft; and to provide a craft that is capable of hovering.

Other objects of the invention are to provide means whereby many of the dangers in the operation of aircraft are overcome, the speed of the craft is materially increased and it has greater carrying capacity per unit of energy expended, and to protect the craft from ice and snow accumulations.

Another object of the invention is to provide an automatic stabilizer means.

The invention provides increased wing area by overcoming the resistance to the forward movement of the device and this affords ample wing surface to glide the plane or to parachute it to the earth with safety in the event of engine trouble.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a fragmentary top plan view of a plane constructed in accordance with the invention, with parts broken away.

Figure 2 is a vertical longitudinal sectional view through Figure 1.

Figure 3 is an elevation of the craft.

Figure 4 is a front view thereof.

Figure 5 is a vertical detailed sectional view.

Figure 6 is a vertical transverse sectional view.

Figure 7 is a fragmentary detailed view of the top part of the wing structure.

Figure 8 is a sectional view of the stabilizer.

Figure 9 is a section on line 9—9 of Figure 8.

Figure 10 is a section on line 10—10 of Figure 1.

Figure 11 is a horizontal sectional view showing how a rudder controls an air outlet.

In these drawings, the letter A indicates the fuselage which is provided with any suitable form of landing gear $a$ and $b$ and it is provided with the cabin or cockpit $c$ in its front end. The wings are shown at B and each wing is preferably of the shape shown in Figures 3 and 4, and the cross sectional shape shown in Figure 10. As shown in Figure 10, these wings include the downwardly and forwardly sloping solid member 1, the top covering or foil 2 and the under covering or screen 3. As will be seen, the top covering has its front portion curving downwardly and forwardly to form the major portion of the front of the wing, and the member 3 has its rear part sloping upwardly and rearwardly. The covering 2 is formed of any suitable material, preferably supported on the tubes 4, so that exhaust gases or the like can be passed through these tubes to prevent accumulation of ice and snow, and the foil 2 is formed with a multiplicity of openings for the admission of air, these openings preferably being formed of curved conduits 5, which extend towards the fuselage so that air can enter the conduits but rain cannot.

A large opening 6 is formed in the member 1, above the fuselage, and a fan F is located below said opening, so that when the fan is in operation, it will draw air through the perforations or openings in the top covering and through the opening into the space between the members 1 and 3 and the air, rushing in through the top member and being forced out through the screen or the bottom member, creates a minus pressure on the top of the wing and a plus pressure on the bottom thereof. The fan is driven by any suitable type of motor M and a shutter 7 is provided for closing the opening 6 when the fan is not in operation, the shutter being moved to closing position by a spring 8 which is so formed that when the fan is in operation, the shutter will be moved to open position, so that air can pass through the opening 6.

A conduit 9 is located above the rear portion of the fuselage and has its front end connected with the space between the members 1 and 3, so that some of the air from the fan will be forced through said conduit and a rudder air duct 10 extends upwardly and rearwardly from the rear portion of the conduit 9, so that the air from this duct 10 will act on the rudder 11.

The elevator 12 is pivoted at the outlet of the conduit 9, and these members 11 and 12 are so arranged that when in neutral position they almost close the outlets, (see Fig. 11) but admit a ribbon-like current of air against the inclined sides of the rudders when the rudders are moved in either direction. This affords control regardless of motion of the plane. The casing or conduit 9 flares rearwardly, while the fuselage tapers rearwardly so that the sides of the conduit 9 form a set of side fins under which are mounted a pair of wings 13 tapering forwardly and each pivoted at the front or small end, as shown at 14, so that said wings can swing inwardly and outwardly and this movement of the wings is controlled by an automatic device illustrated in Figures 8 and 9 and consisting of a substantially triangular-shaped casing 15 containing glycerine or the like and having a swinging member 16 therein pivoted at its upper end in the upper part of the casing 15, as shown at 17. This member assumes a vertical position under the action of gravity so that when the plane tilts, the member 16, through the connection shown generally at 18, will operate a pulley 19 over which a belt 20 passes, the belt also passing over an idle pulley 21. A portion of the belt is connected by the member 22 and the links 23 to the wings 13.

A by-pass 24 connects the casing 15, at one side of the member 16, with a part of the casing at the other side thereof, and the by-pass is controlled by the gate valve 25. This arrangement prevents undue swinging movement of the member or pendulum 18.

Since the member 1 is inclined toward the direction of travel of the craft, at an angle of approximately 10°, the transfer of air from above it to the other side thereof, will supply both lifting power and forward motive power, and in order to regulate the minus pressures above the wings so as to vary one relative to the other, a member 26 is located above the opening 6 and is pivoted at its rear end, as shown at 27 in Figure 1, so that the member can be swung from a longitudinal position to angular positions to each side of the longitudinal position, as shown in Figure 1. Thus the minus pressure can be reduced on one wing and increased on the other by adjusting this member. This member takes the place of the ailerons used in other planes and has many advantages thereover. For instance, in making a turn at high speed, the forward draft of the elevated wing is increased, which causes a much shorter turn and the operation thereof does not create resistance to the movement of the wing.

The member 7, closing the opening 6 when the fan is not in motion, will prevent backward flow of air when gliding or making landings with a dead motor.

In case of motor failure, a portion of the air compressed under the intermediate member 1, will be conveyed to the rudders so that the craft can be landed without damage.

When the motor is started with the plane on the ground, the nose of the plane will be elevated ten or twelve degrees above its flying position, thus all motive power (with the exception of that going to the tail controls) are perpendicular. This is also the hovering position of the plane.

Before the motor is started, shutter 7 will be held by the delicate spring in the upward position. When the fan is put into motion, a vacuum is created on the underside of shutter 7 thus forcing it downward until it rests on the spokes of the fan arms. As the motor is increased in speed, the minus pressure above and the plus pressure beneath, increase in proportion to the fan speed. This also starts the current of air flowing thru the air ducts to the tail controls. At this time, the tail may be elevated to flying position and the take-off made in the usual manner, or a perpendicular ascent may be made until the desired altitude is obtained. The tail may be elevated to the flying position thus changing the angle of the plane and giving it its forward draught.

In flight, the plane will be operated and controlled in the usual manner.

A landing may be made in the usual manner, or by bringing the plane to a hovering position and reducing the motor speed to such a degree as to give a gentle descent.

In case of fog over a landing field, a gentle vertical descent may be made with one hand on the engine throttle and if danger is observed below, a mere increase in the engine speed will change the descent into an ascent and the pilot can move off and try again.

In making a vertical landing, with a dead motor, a part of the air pressure created under the wings is conveyed to the tail controls by means of ducts 8 and 9, thus enabling a lateral balance by use of the elevator. In substantially all former heavier than air devices of this class, all lifting power is created by the motion of the device (with the exception of the autogyro which has a dual lifting means). The wings being so disposed on an angle to the line of movement that rapid movement through the air causes a plus air pressure on the under side and to the front of the wing, a minus pressure on the top and to the back of the wing, or both.

It will readily be seen that all plus pressures in front of the wing, and all minus pressures to the back thereof, sets up a tremendous resistance to the forward movement of the wing.

It will be seen by a study of the present invention, that this resistance is not only overcome, but is converted into a forward propelling power, this being accomplished by a change of the plus pressures from the bottom and front of the wing to the bottom and back, and the minus pressures from the top and back to the top and front of the wing respectively.

In this device, the said forward propelling power supplies the forward motive power.

It is thought from the foregoing description that the advantages and novel features of the invention will be readily apparent.

It is to be understood that changes may be made in the construction and in the combination and arrangement of the several parts provided that such changes fall within the scope of the appended claims.

What is claimed is:

1. In a flying device, the combination of a hollow wing structure formed with two members having an air space therebetween, one of the members having upwardly extending louvres extending transversely across the top and opening at their upper edge toward the middle of the flying device and the other oblique to the plane of the wing, and mechanical means for drawing air through said louvres and reducing the air pressure between the two members and discharging air against the under side of the oblique member.

2. In a flying device, the combination of a wing structure formed with two members having an air space therebetween, raised louvres extending transversely across the top of the upper member and opening at their upper edge toward the center of the flying device, and the other oblique to the plane of the wing, and mechanical means for drawing air through said louvres and through said air space and discharging such air against the under face of the oblique member.

JOHN W. JACKSON.